(12) United States Patent
Hanley

(10) Patent No.: US 9,669,773 B2
(45) Date of Patent: Jun. 6, 2017

(54) RACK AND TRAY DEVICE

(71) Applicant: DeJana Cargo and Van Interiors, Inc., Rosedale, MD (US)

(72) Inventor: Charles L. Hanley, Woonsocket, RI (US)

(73) Assignee: Dejana Truck & Utility Equipment Company, LLC, Milwaukee, WI (US)

( * ) Notice: Subject to any disclaimer, the term of this patent is extended or adjusted under 35 U.S.C. 154(b) by 157 days.

(21) Appl. No.: 14/272,946

(22) Filed: May 8, 2014

(65) Prior Publication Data

US 2015/0014381 A1 Jan. 15, 2015

Related U.S. Application Data

(63) Continuation of application No. 12/456,934, filed on Jun. 24, 2009, now Pat. No. 8,763,820.

(51) Int. Cl.
| | |
|---|---|
| *B60R 11/06* | (2006.01) |
| *A47B 46/00* | (2006.01) |
| *A47B 81/00* | (2006.01) |
| *B60P 3/14* | (2006.01) |
| *A47B 88/417* | (2017.01) |
| *A47F 5/00* | (2006.01) |
| *B60R 11/00* | (2006.01) |

(52) U.S. Cl.
CPC .............. *B60R 11/06* (2013.01); *A47B 46/00* (2013.01); *A47B 81/00* (2013.01); *A47B 88/417* (2017.01); *B60P 3/14* (2013.01); *A47F 5/0093* (2013.01); *B60R 2011/0052* (2013.01)

(58) Field of Classification Search
CPC . B60R 11/06; B60R 2011/0052; A47B 46/00; A47B 88/0451; A47B 88/417; A47B 81/00; B60P 3/14; A47F 5/0093
USPC ............... 211/70.01, 90.01, 126.15, 88.01; 312/242, 245, 257.1, 301, 321, 330.1, 312/334.7, 351.1, 351.14; 296/37.13, 296/37.16, 26.09, 24.44, 24.45; 414/522
See application file for complete search history.

(56) References Cited

U.S. PATENT DOCUMENTS

| | | | |
|---|---|---|---|
| 1,720,260 A | 7/1929 | Bowen, Jr. et al. | |
| 2,729,498 A | 1/1956 | Law | |
| 2,784,027 A | 3/1957 | Temp | |
| 2,825,617 A | 3/1958 | Morgan | |
| 3,133,768 A * | 5/1964 | Klakovich | A47B 88/08 312/323 |
| 3,589,768 A | 6/1971 | Wilson | |

(Continued)

OTHER PUBLICATIONS

International Search Report and Written Opinion of the International Searching Authority dated May 21, 2010, of International Application No. PCT/US10/00808 of DeJana Cargo & Van Interiors Inc., filed on Mar. 18, 2010.

*Primary Examiner* — Stanton L Krycinski
(74) *Attorney, Agent, or Firm* — Sorell Lenna & Schmidt, LLP

(57) ABSTRACT

A rack and tray device formed from a pair of side panels mountable on the floor of an area and attached to the sides of the area, such as the inside of a van. Guide members are on the side panels and include a channel shape extending inward to accept a tray member carried by the channel shape and maintained in a substantially horizontal orientation when objects are placed on the at least one tray member. The guide members are slidably mounted to further support the tray and prevent it from tipping.

18 Claims, 3 Drawing Sheets

(56) References Cited

U.S. PATENT DOCUMENTS

| | | | |
|---|---|---|---|
| 3,757,967 A | 9/1973 | Colbridge | |
| 4,030,609 A | 6/1977 | Liebetrau et al. | |
| 4,131,203 A | 12/1978 | Bridges | |
| 4,482,066 A | 11/1984 | Dykstra | |
| 4,705,315 A | 11/1987 | Cherry | |
| 4,889,377 A * | 12/1989 | Hughes | B60P 3/14 16/102 |
| 4,899,895 A | 2/1990 | Espasandin et al. | |
| 4,950,123 A * | 8/1990 | Brockhaus | B60P 1/64 224/403 |
| 5,064,335 A | 11/1991 | Bergeron et al. | |
| 5,269,447 A | 12/1993 | Gower et al. | |
| 5,470,144 A * | 11/1995 | Wen | A47B 88/10 312/330.1 |
| 5,571,256 A | 11/1996 | Good et al. | |
| 5,845,952 A | 12/1998 | Albertini et al. | |
| 5,988,722 A * | 11/1999 | Parri | B60P 1/003 224/403 |
| 6,065,792 A * | 5/2000 | Sciullo | B60P 1/003 296/26.09 |
| 6,244,646 B1 | 6/2001 | Wheeler, III | |
| 6,390,525 B2 * | 5/2002 | Carpenter | 296/26.09 |
| 6,659,524 B1 * | 12/2003 | Carlson | B60P 1/003 296/26.09 |
| 6,659,577 B2 * | 12/2003 | Lauchner | H05K 7/1421 312/223.1 |
| 6,758,508 B2 * | 7/2004 | Weyhrich | B62D 33/0273 296/100.18 |
| 6,834,923 B2 * | 12/2004 | Young | A47B 88/12 312/334.1 |
| 6,938,967 B2 * | 9/2005 | Dubon | H05K 7/1421 312/330.1 |
| 7,121,603 B2 * | 10/2006 | Stevenson | B60P 1/003 296/26.09 |
| 7,219,952 B2 | 5/2007 | Taylor | |
| 7,232,172 B2 * | 6/2007 | Kiester | B60P 7/14 296/26.08 |
| 7,258,317 B1 | 8/2007 | Nagle | |
| 7,338,110 B1 | 3/2008 | Eckloff | |
| 7,455,312 B2 * | 11/2008 | Senatore | B60D 1/54 280/475 |
| 7,604,307 B2 * | 10/2009 | Greenwald | A47B 88/08 312/333 |
| 7,712,812 B2 * | 5/2010 | Gagliano | B60P 1/003 296/26.09 |
| 7,780,254 B2 * | 8/2010 | Wang | A47B 88/12 108/143 |
| 8,104,851 B2 * | 1/2012 | Lu | H05K 7/1489 312/334.5 |
| 8,132,875 B2 * | 3/2012 | Juang | A47B 88/08 312/333 |
| 2006/0273605 A1 * | 12/2006 | Haspel | B60R 7/02 296/26.09 |
| 2007/0069542 A1 | 3/2007 | Steiger et al. | |

\* cited by examiner

RACK AND TRAY DEVICE

CROSS-REFERENCE TO RELATED APPLICATION

This application is a continuation of application Ser. No. 12/456,934, filed on Jun. 24, 2009, the contents of which is incorporated herein by reference in its entirety.

BACKGROUND

The present invention relates to a rack and tray device for use in an enclosed area having a floor and side walls. More particularly it relates to a device that can be mounted in an area of a vehicle, such as a van or other truck, at a location in the vehicle where access to the device is provided via a door or doors, such as the back doors of a van, whereby the tray or trays held by the device can be partially or totally removed to give access to objects on the tray or trays.

Trucks and other vehicles often are manufactured and sold in a generic condition and are customized or added to when sold to a specific industry. For example, construction company trucks have special boxes and racks to store tools and equipment, and to provide access to them. Delivery trucks have different requirements.

Sometimes all that is delivered from the vehicle manufacturer is the chassis of the truck, leaving the inside of the vehicle to be fitted with shelves or racks as determined by the user. It would be a great advance in the trucking industry if a device could be provided for basic vehicles such as vans that would provide a rack and tray assembly to permit a variety of uses for the vehicle.

SUMMARY

The present invention is a rack and tray assembly that serves as a primary storage area on the tray or trays, and that is fixedly mounted to the area. The device includes a frame or rack that is preferably rectangular in shape and is sized to fit in an area such as, but not limited to, the back of a van or cargo truck.

The rack is mounted on the floor of the area and is further attached to the sides of the area, such as the sides of a van for example. The rack further includes at least one pair of guide members in the shape of a channel with the sides of the channel mounted on the rack and the top and bottom of the channel sized to hold a tray. In a preferred embodiment, the channel is slidably mounted on a cross member of the frame so that it extends out as the tray is being moved out to further support the tray and prevent it from tipping or rotating to the vertical.

DETAILED DESCRIPTION

Figure 1:
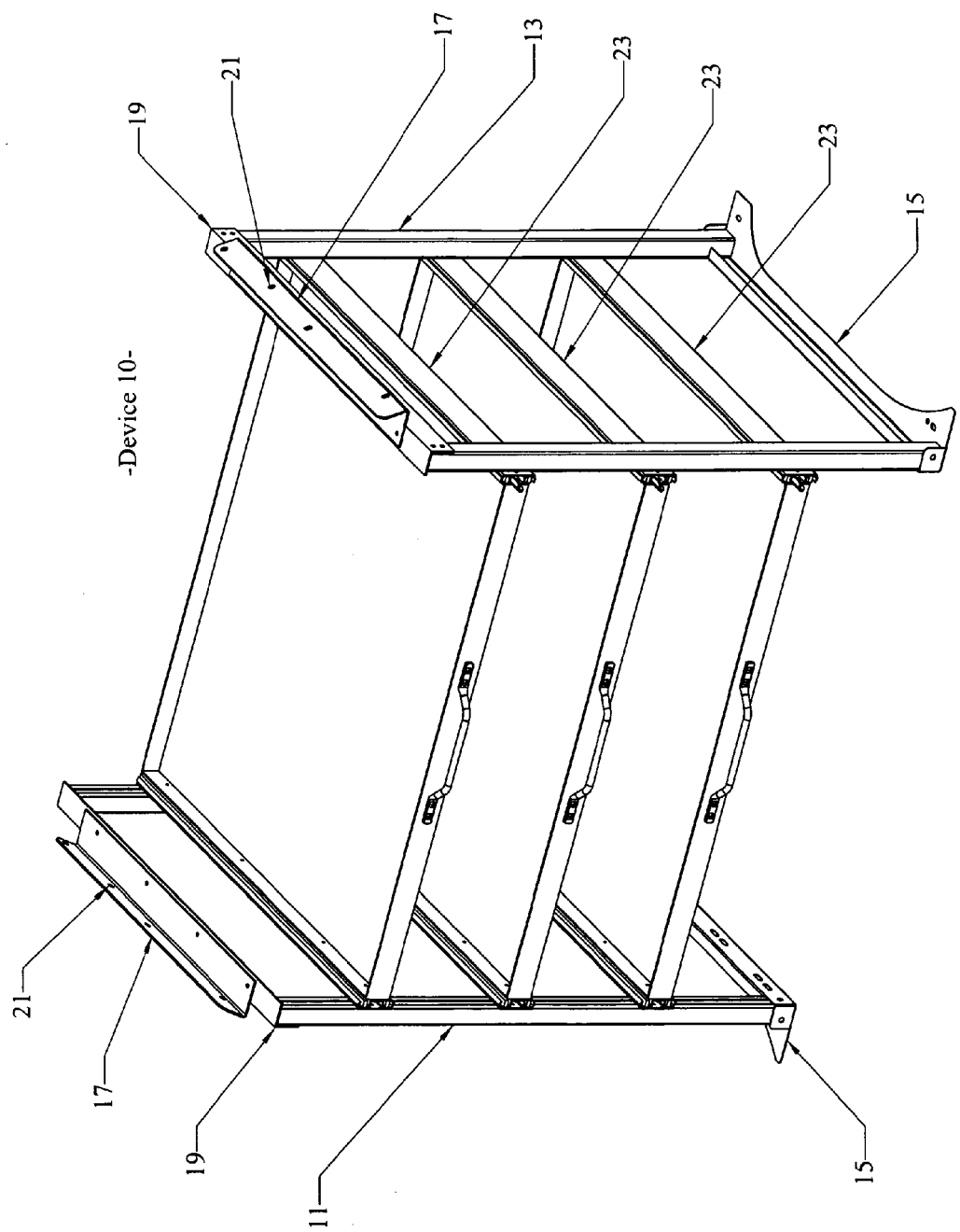
FIG. 1 is a perspective view of the device of this invention.

The device of this invention 10 generally in FIG. 1 comprises a rack and tray device that is used in an enclosed area having a floor and walls or other vertical supports to which the device is attached. The device 10 is described as being used in a van type vehicle with two back doors that swing open wider than the device and where the floor and walls of the vehicle are suitable for mechanical attachment of the device such as with nuts and bolts. It is to be understood that other vehicles and other areas such as sheds and the like are also contemplated as being within the scope of this invention.

Device 10 includes a pair of side panels 11 and 13, shown as rectangles in FIG. 1. Side panels 11 and 13 may be other shapes as well since the function is to attach to the area walls and floor and support the remaining elements. Side panels 11 and 13 have a bracket 15 at the bottom for fastening to the floor of the area, such as the floor of a van. Side panels 11 and 13 also have a bracket 17 at the top member 19 of both side panels 11 and 13, shown as an "L" shaped member with bolt holes 21. Side panels also have cross members 23 at every location where a tray is to be inserted and supported.

Figure 2:
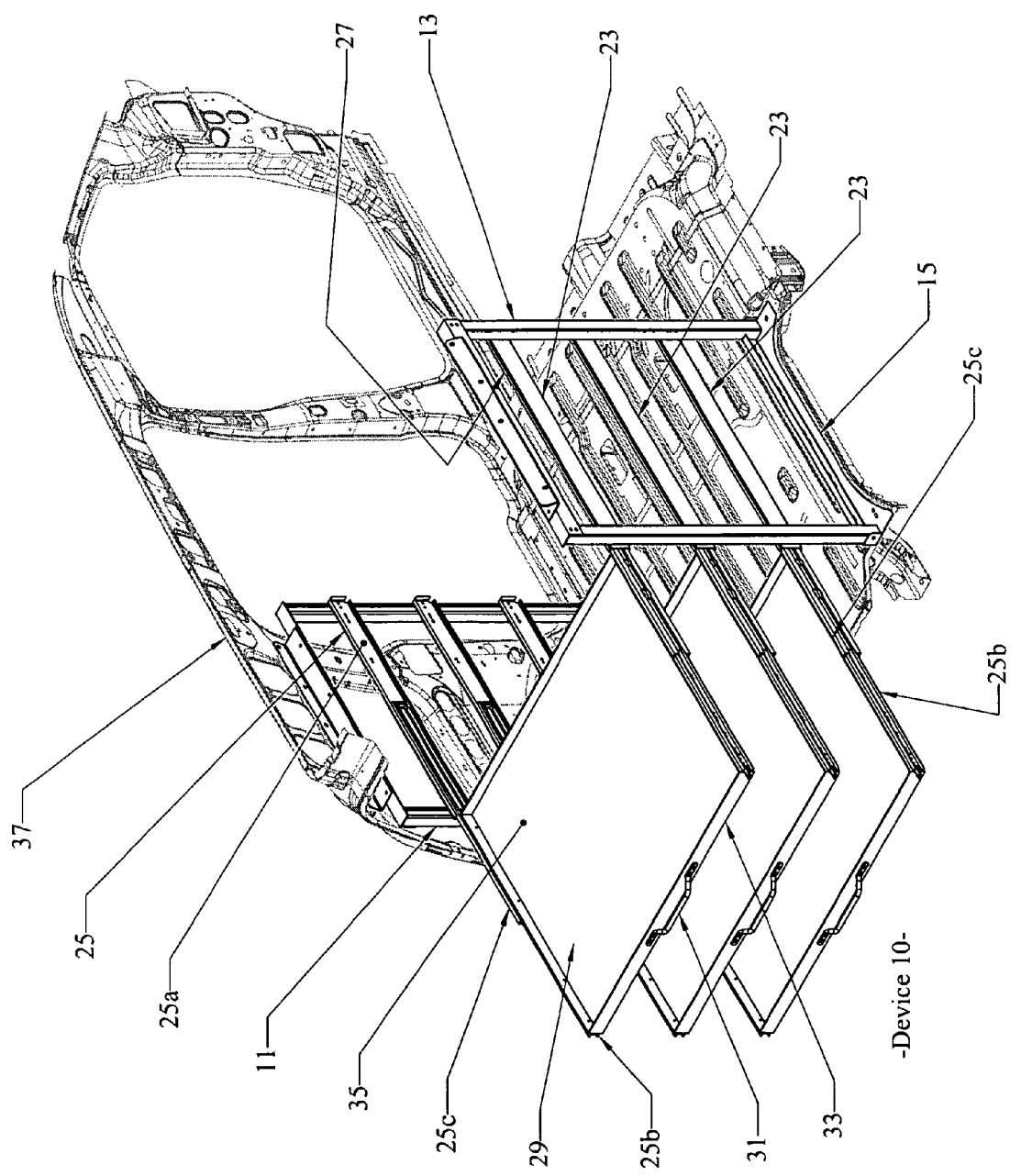
FIG. 2, is a perspective view of the device of FIG. 1 installed in a vehicle shown partially cut away and with trays about to be inserted.

Device 10 also includes at least one pair of guide members 25 and 27 mounted on each cross member 23, with one being mounted on each of the side panels 11 and 13. FIG. 2 illustrates three sets of guide members but any number from one to the number reaching the limit of the available space are contemplated by this invention. Guide members 25 and 27 are shown as "U" shaped, turned sideways so that the flat or middle portion 25*a*, in FIG. 2, is attached to a cross member 23 on side panel 11. The bottom portion 25*b* of guide member 25 extends out sufficiently to give a surface on which tray 29 rests, while top portion 25*c* of guide member 25 also extends out and functions to prevent tray 29 from tipping from a flat, horizontal orientation as shown in the figures. For example, if a heavy tool box, not shown, is placed on the front of tray 29 in FIG. 2, tray 29 will not tip because it engages top portion 25*c* of guide member 25.

Each pair of guide members 25 and 27 is designed to hold a tray 29 having opposite front and back ends, the front end comprising a handle 31. The front and back ends of tray 29 each extend between first and second ends of tray 29. One of the first and second ends of tray 29 is coupled to bottom portion 25*b*. Trays 29 are shown as having a raised rectangular frame 33 with a flat portion 35 on which objects may be placed as noted above. Frame 33 is metal, though other materials are also within the scope of this invention, just as the metal flat portion 35 may be made from cardboard, wood, plastic or other materials. Frame 33 preferably has sufficient strength that it resists bending when subjected to vertical loads, particularly when being inserted or removed into device 10.

Figure 3:
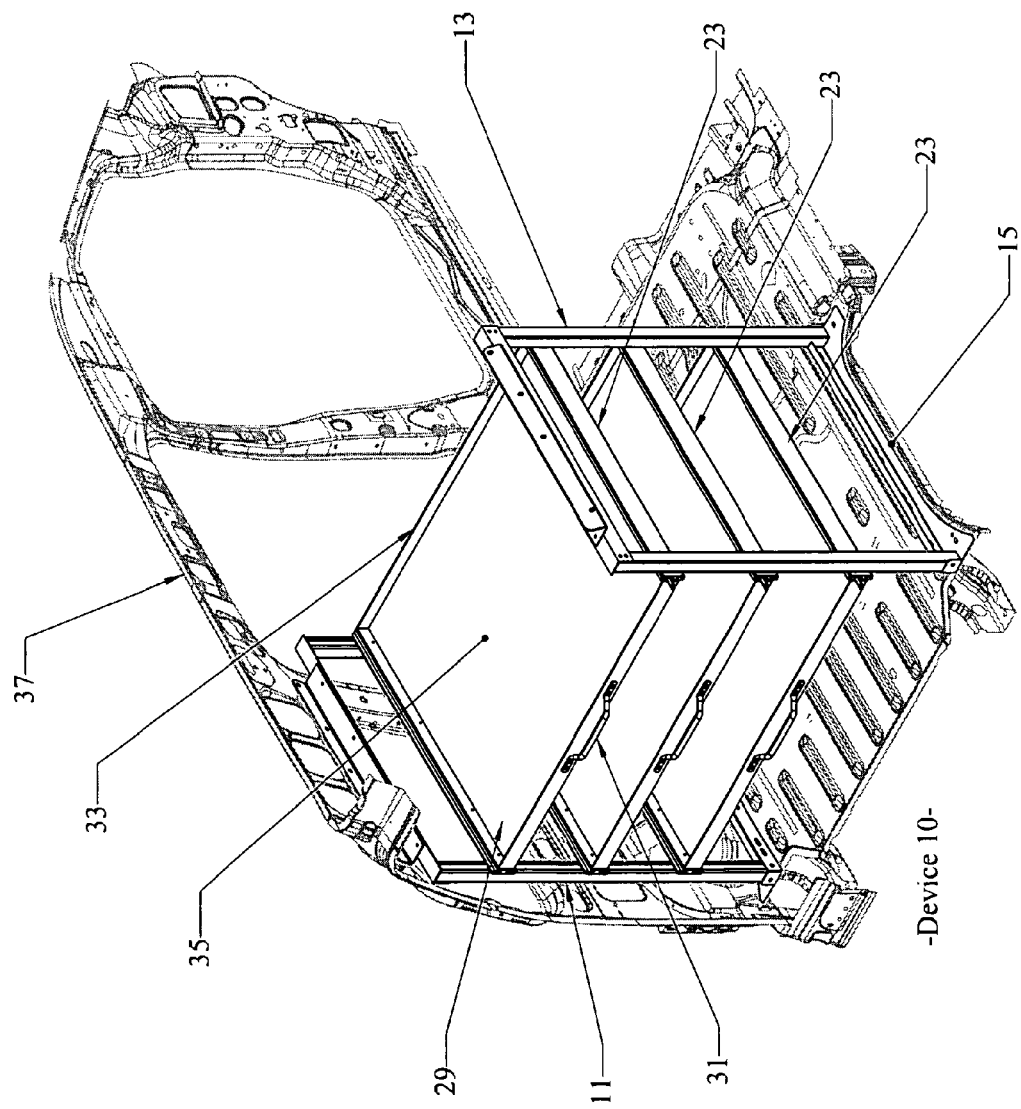
FIG. 3 is a perspective view of the device of FIG. 2, with the trays in place.

In FIGS. 2 and 3, device 10 is shown after being attached to the inside of a van type vehicle, though, as noted above, other areas may be used also. Van frame 37 supports device 10 by attachment thereto at bottom bracket 15 and top bracket 17 as described above. Device 10 is movable between a first configuration, shown in FIGS. 1 and 3, wherein the front end of tray 29 is aligned with side panel 11 and the back end is aligned with side panel 13 and a second configuration, shown in FIG. 2, in which the back end of tray 29 is positioned between the front end of tray 29 and side panel 11.

Although the present invention has been described with reference to preferred embodiments, workers skilled in the art will recognize that changes may be made in form and detail without departing from the spirit and scope of the invention.

The invention claimed is:

1. A shelving system comprising:
   a vehicle having a floor and opposite first and second side walls, the vehicle having a side doorway in the first sidewall and a back doorway positioned between the sidewalls, the first and second side walls being supported by a frame of the vehicle; and
   a rack and tray device positioned between the side doorway and the back doorway, the rack and tray device comprising:
      a pair of spaced apart side panels extending parallel to one another, the side panels each extending between a top end and a bottom end,
      a bottom mounting bracket connecting the bottom ends, the bottom mounting bracket being mounted on the floor,
      a top mounting bracket connecting the top ends, the top mounting bracket being mounted on the frame adjacent the first side wall of the vehicle,
      a cross member including a first end that engages one of the side panels and a second end that engages the other side panel,
      a guide member comprising a middle portion that is fixed to the cross member, a top portion slidably disposed within the middle portion and a bottom portion slidably disposed within the top portion, and
      a tray member coupled to the bottom portion, the tray member comprising a handle that is fixed to a frame of the tray member.

2. A shelving system as recited in claim 1, wherein the bottom ends are spaced apart from the frame of the vehicle and the first side wall.

3. A shelving system as recited in claim 1, wherein the bottom ends are spaced apart from the frame of the vehicle and the first side wall by the bottom mounting bracket.

4. A shelving system as recited in claim 1, wherein the top ends are spaced apart from the frame of the vehicle and the first side wall.

5. A shelving system as recited in claim 1, wherein the top ends are spaced apart from the frame of the vehicle and the first side wall by the top mounting bracket.

6. A shelving system as recited in claim 1, wherein the tray member is carried by the bottom portion such that the tray member is maintained in a substantially horizontal orientation by the top portion when objects are placed on a flat portion of the tray member.

7. A shelving system as recited in claim 1, wherein the top mounting bracket includes a first bolt hole, the frame of the vehicle includes a second bolt hole and a bolt extends through the first and second bolt holes to fix the top mounting bracket relative to the frame of the vehicle.

8. A shelving system as recited in claim 1, wherein the top bracket comprises a first portion that connects the top ends and a second portion that attaches to the first portion, the second portion being an "L" shaped member.

9. A shelving system as recited in claim 8, wherein a fastener extends through the second portion and into the frame of the vehicle to connect the top mounting bracket with the frame of the vehicle.

10. A shelving system as recited in claim 1, wherein the frame of the tray member comprises a front end and a back end, the front and back ends extending between first and second ends of the frame of the tray member, the front end being aligned with one of the side panels and the back end being aligned with the other side panel.

11. A shelving system as recited in claim 10, wherein the front end comprises the handle.

12. A shelving system as recited in claim 1, wherein:
   the frame of the tray member comprises a front end and a back end, the front and back ends extending between first and second ends of the frame of the tray member, the handle being mounted to the front end; and
   the rack and tray device is movable between a first configuration in which the front end is aligned with a first one of the side panels and the back end is aligned with a second one of the side panels and a second configuration in which the back end is positioned between the front end and the first one of the side panels.

13. A shelving system as recited in claim 12, wherein at least a portion of the tray member is positioned outside of the vehicle frame when the rack and tray device is in the second configuration.

14. A shelving system as recited in claim 1, wherein the rack and tray device is mounted on the floor such that the rack and tray device is proximate the back doorway.

15. A shelving system as recited in claim 1, wherein the back doorway extends perpendicular to the side doorway.

16. A shelving system as recited in claim 1, wherein the back doorway comprises a maximum width that is greater than that of the rack and tray device.

17. A shelving system as recited in claim 1, wherein:
   the cross member comprises a plurality of cross members, the guide member comprises a plurality of guide members and the tray member comprises a plurality of tray members; and
   the cross members are each spaced apart from one another.

18. A shelving system as recited in claim 1, wherein the bottom mounting bracket includes a first bolt hole, the floor of the vehicle includes a second bolt hole and a bolt extends through the first and second bolt holes to fix the bottom mounting bracket relative to the floor of the vehicle.

* * * * *